(12) United States Patent
Loce et al.

(10) Patent No.: US 6,775,410 B1
(45) Date of Patent: Aug. 10, 2004

(54) IMAGE PROCESSING METHOD FOR SHARPENING CORNERS OF TEXT AND LINE ART

(75) Inventors: Robert P. Loce, Webster, NY (US); Wei Zhu, Rochester, NY (US); Clara Cuciurean-Zapan, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/579,089

(22) Filed: May 25, 2000

(51) Int. Cl.[7] ................................................ G06K 9/62
(52) U.S. Cl. .................... 382/209; 382/218; 382/266; 358/447
(58) Field of Search ................................. 382/141, 151, 382/165, 173, 176, 181, 199, 205, 209, 217, 218, 225, 254, 263, 266, 269, 274, 275, 288, 294, 299, 309, 310; 358/1.9, 3.01, 442, 447, 448, 462, 504

(56) References Cited

U.S. PATENT DOCUMENTS

| | | | |
|---|---|---|---|
| 4,389,677 A | * 6/1983 | Rushby et al. | ............... 358/463 |
| 4,437,122 A |   3/1984 | Walsh et al. | ................. 358/166 |
| 4,847,641 A |   7/1989 | Tung | .......................... 346/154 |
| 5,237,646 A | * 8/1993 | Bunce | ........................ 358/1.18 |
| 5,383,036 A |   1/1995 | Mailloux et al. | ........... 358/518 |
| 5,987,221 A | * 11/1999 | Bears et al. | ................. 358/1.9 |
| 6,021,256 A | * 2/2000 | Ng et al. | ..................... 358/1.9 |
| 6,195,467 B1 | * 2/2001 | Asimopoulos et al. | ....... 382/261 |
| 6,430,321 B1 | * 8/2002 | Choo | .......................... 382/299 |
| 6,504,947 B1 | * 1/2003 | Nozaki et al. | ............... 382/148 |

OTHER PUBLICATIONS

Kubota, et al. "Edge based probabilistic relaxation for sub-pixel contour extraction", Department of Computer Science and Engineering, University of South Carolina, pp. 1–16, 1997.*

Nitzberg, et al. "Nonlinear image filtering with edge and corner enhancement", IEEE, pp. 826–833, 1992.*

Richard Rubinstein, *Digital Typography: An Introduction to Type and Compostion for Computer System Design*, Addison–Wesley Publishing Company, 1988, pp. 78–81.

Robert P. Loce, Clara Cuciurean–Zapan and Leon Williams, Serial No. 09/505,875, "Loose–Gray–Scale Template Matching".

R. Loce, M. Cianciosi, and Ying Wei Lin, Ser. No. 09/219, 705, "Systems and Methods for Template Matching of Multicolored Images".

* cited by examiner

*Primary Examiner*—Daniel Mariam
(74) *Attorney, Agent, or Firm*—Christopher D. Wait

(57) ABSTRACT

A method for sharpening the corners of digital image data to overcome corner rounding when displayed or printed. The method comprises stepping a window across the image data and comparing that windowed data to a template. Upon determining a match, pixel data is either substituted into the image bitmap data at that location, or a signal is generated which will appropriately modify the writing of that image data. The data substitution or generated signal will achieve a localized clustering or "ear" of toner/ink, or in the alternative for inside corners the localized clustered absence of toner/ink. The result of this clustering is a sharpening of the corners so that they image as intended by the bitmap.

32 Claims, 13 Drawing Sheets

FIG. 6
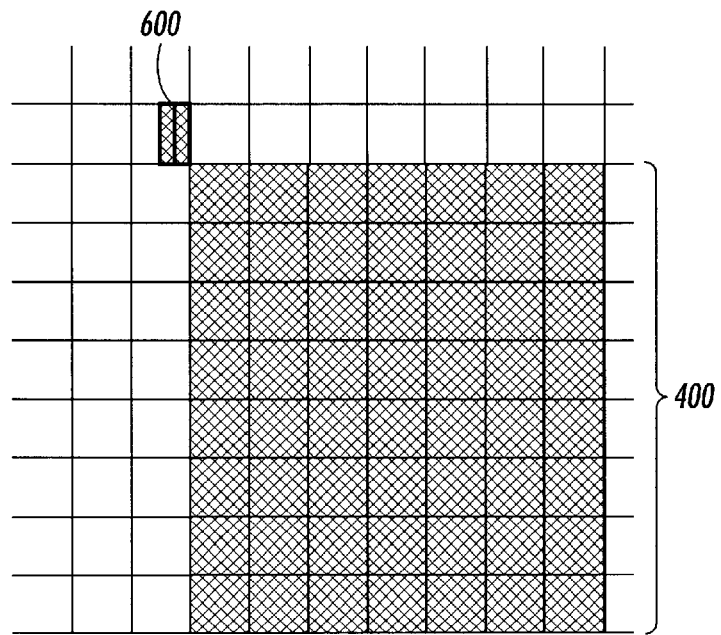
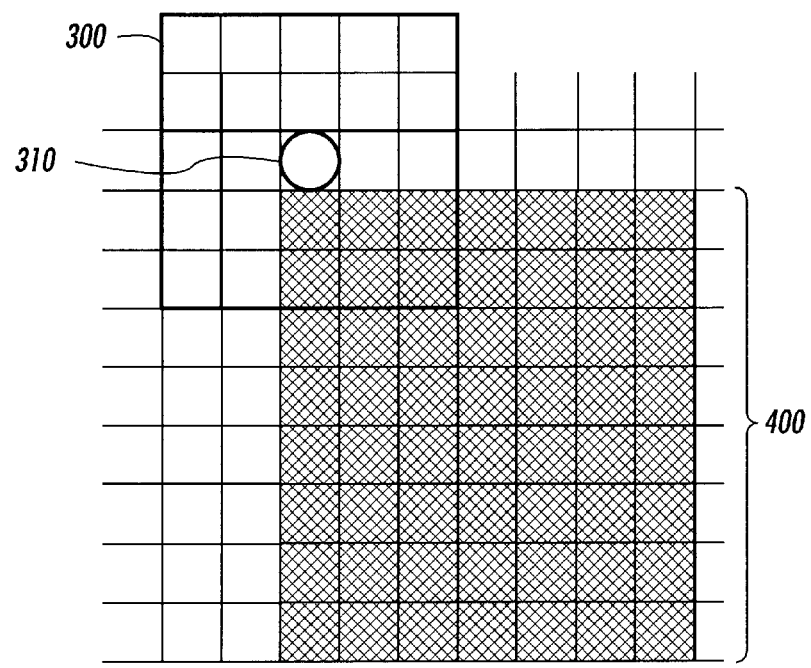
FIG. 7

IMAGE PROCESSING METHOD FOR SHARPENING CORNERS OF TEXT AND LINE ART

RELATED CASES

Cross reference is made to the following application incorporated in its entirety by reference herein for its teaching: U.S. patent application Ser. No. 09/505,875 entitled "Loose-Gray-Scale Template Matching" which is now U.S. Pat. No. 6,678,414 issued Jan. 13, 2004 to Robert P. Loce, Clara Cuciurean-Zapan and Leon Williams.

BACKGROUND OF THE INVENTION AND MATERIAL DISCLOSURE STATEMENT

The present invention relates to a methodology for improving the print quality of line-art corners and other fine details as found in both font and image data. Due to the nature of inks, paper and printing, these types of problems are well known in the printing arts.

In the printing arts this problem was typically overcome by manual image customization by hand of any troublesome detail areas. This was particularly the case with fonts or reusable type. For example, ink traps would be added to those areas in a font character where too much ink would otherwise collect and cause smearing. Similarly, detail areas would be sharpened to insure the desired print result.

This approach of compensating to get a desired result such as sharpening has followed-on from the print arts into the digital imaging arts. As an example, *Digital Typography: An Introduction to Type and Composition for Computer System Design,* by Richard Rubinstein, discusses the desirability of compensating for electrostatic effects which result in toner not being placed on the paper exactly as the bit image specifies. Compensation is depicted there as adding to the image bit map to sharpen convex (outside) corners which would otherwise get rounded over. An alternative compensation is also depicted for handling situations involving concave (inside) corners by removing black printing pixels from the corner region of a shape to make an ink trap. In FIG. 18 there is depicted the bit image data and thereby the desired print image. In FIG. 19 is depicted the rounded-over result when printed on a given printer. FIG. 20 shows the bit image compensation which when printed will yield the desired result as depicted in FIG. 18 above. Note the ears 2000 added to the outside corners and the ink trap 2010 added to address the inside corner.

The following appear to be relevant to manipulation and enhancement of the edges of image shapes. They are incorporated by reference in their entirety for their teaching, particularly of template matching, and of bit map or signal substitution.

In U.S. Pat. No. 4,847,641 to Tung, print enhancement circuitry to enhance the printed image produced by a laser beam printer is interposed between the character generator circuits and the laser drive circuits to modify the laser drive signals provided by the character generator circuits. Bit data representing successive lines of the bit map for a desired image are stored in a first-in first-out (FIFO) buffer. The bit pattern sample window having a central cell (bit) and a selected (arbitrary) number of neighboring bits is compared to a number of matching bit patterns or templates, each of which is associated with an error element or cell. When a logic matching network detects a match, a modification signal associated with a unique compensation cell (bit) is generated. The sample window central bit is then replaced (modified) with the unique compensation bit required by the matching template. In this manner, all bits in a desired bit map, or set of bit maps, are examined and their corresponding laser drive signals modified to compensate for the errors associated with the matched templates in a piece-wise manner.

In U.S. Pat. No. 5,383,036 to Mailloux et al., a method for enhancing the contour fidelity of printed images of two or more colors is described, which includes obtaining a digital representation of the color image and finding color separations of each color. Each color separation is enhanced by a single set of inverse symmetrical templates, the set including templates in which the second template is always the inverse of the first, and the third and fourth templates are 180 degree rotations of the first two. The resulting smoothed color separations are recombined into an enhanced image without separation error.

In U.S. Pat. No. 4,437,122 to Walsh et al., presents an invention which enhances the resolution and quality of characters of a system receiving the information initially in the form of video display pixels and providing hard copy output. This is accomplished by storing at least three successive lines of video data in successive, parallel connected shift registers, applying the outputs of the shift registers to a decoder, and generating driving signals for the printer head. The decoder compares the pixels on the same line as well as in preceeding and succeeding lines that surround each specific input pixel to generate the printer head driving signals according to whether straight or curved line segments are to be formed. In effect, the printer increases the density of the information elements and simultaneously provides rounding off of character edges and smoothing of diagonals.

Therefore, there exists a need for a technique which will solve the problem of corner rounding in an automated, non-manual processing operation. Thus, it would be desirable to solve this and other deficiencies and disadvantages with an automated processing methodology.

SUMMARY OF THE INVENTION

The present invention relates to a method of corner sharpening in the display of a bitmapped digital image. The method comprises identifying pixel locations near a corner by comparing the bitmap digital image to templates and, substituting pixel values in the identified pixel locations to achieve a clustering of the substituted pixel values about the corner.

More particularly, the present invention relates to a method of corner sharpening in the display of a bitmapped digital image, by identifying pixel locations near a corner by comparing the bitmap digital image to templates and, generating a signal appropriate to modify the writing of the bitmap digital image and achieve a clustering of the substituted pixel values about the corner.

BRIEF DESCRIPTION OF THE DRAWINGS

FIG. 6 depicts the bitmap data result of a first template match.

FIG. 7 shows a window placed upon a second address in the image data bitmap.

DESCRIPTION OF THE INVENTION

Figure 1:
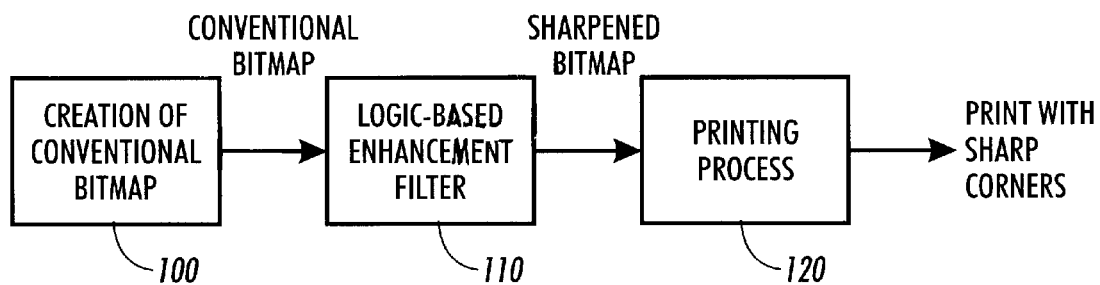
FIG. 1 depicts an overview schematic of an enhanced printing process.

It is to be understood that the following invention describes a digital data technique which sharpens the corners of image data to compensate for corner rounding. This technique, as such, may be performed wherever digital image data is found. However, as depicted in FIG. 1, a preferred embodiment will utilize the technique close to the point of actual print or display. In FIG. 1, block 100 shows the input of bit map digital image data into logic-based enhancement filter block 110, where the following invention description is preferably performed. The output of block 110 produces a sharpened bitmap for printing process 120, or in one possible alternative a correction signal for suitably directing the printing process 120.

Figure 2:
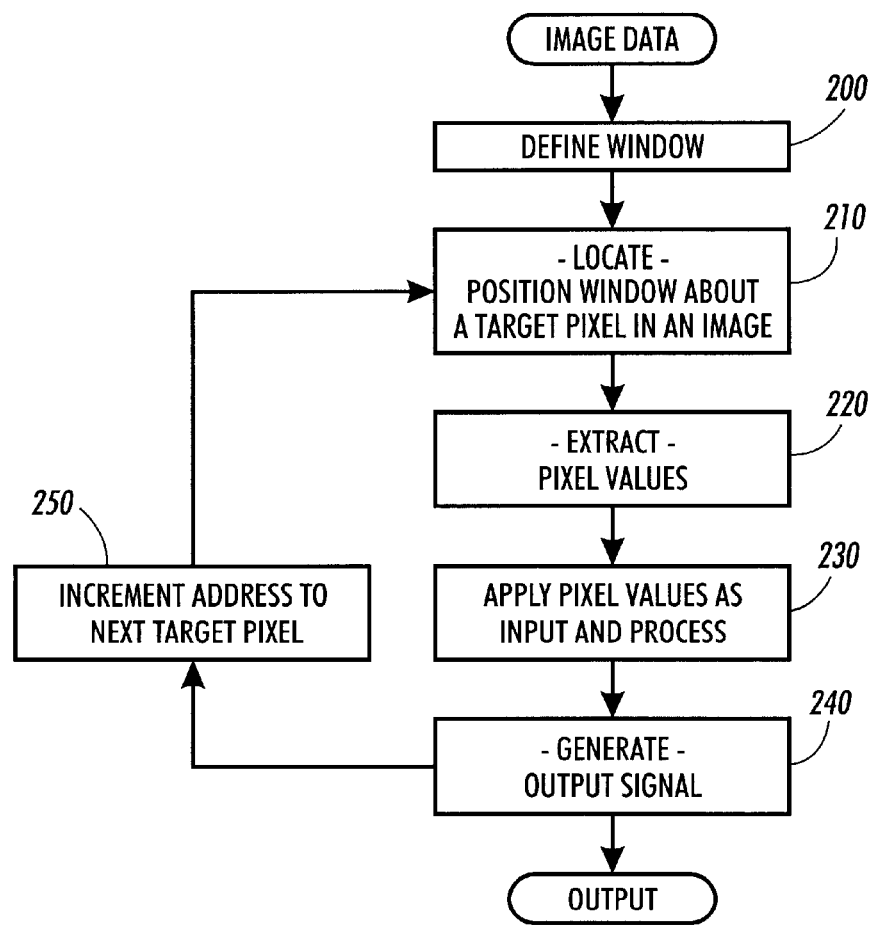
FIG. 2 depicts a flow chart of an enhanced printing process.

FIG. 2 further depicts a preferred operational procedure as would be performed within the logic-based enhancement filter block 110 of FIG. 1. In FIG. 2 raster scan image data is supplied as input data into window definition block 200. Once this window is defined it is then positioned as centered about a target pixel within the raster scan data as shown by the locate block 210. In a preferred embodiment this window is 5×5 pixels in dimension with the center pixel as the window origin, where the center pixel is used to locate the window on the target pixel. However, a smaller widow such as a 3×3 or in the alternative a larger size window, or even a window of a non-square shape, are well within the contemplation of the present invention. This window is stepped through the image pixel data. In a preferred embodiment the center pixel is stepped to target pixels from top to bottom and from left to right through all address locations within an image. Typically all pixels within the input image become target pixels in a successive manner. At each location the pixel values are extracted from within the window as indicated in step 220.

In step 230 the extracted pixel values are used as input into processing means. There are many approaches that may be taken here including hardwire digital compare circuits etc., as will be evident to those skilled in the art. However, in a preferred embodiment templates stored in memory are compared against the extracted pixel values. Depending upon the result the generated output signals in step 240 provide altered pixel values. If there is no match between the stored templates and the extracted pixel data then there is no alteration of the signal output. In a preferred embodiment, upon indication of a match to the template stored in memory, the data in the target pixel is rewritten so as to best sharpen the corner data by forming a localized cluster type structure. In the case of an outside corner, the structure has the same sense as the object being sharpened, that is, a dark outside corner would require a dark sharpening structure imposed upon a background, where dark may be for example represented as a 1 in the bit map. In the case of an inside corner, the structure has the same sense as the background, that is, a light background would require a light sharpening structure imposed upon the object, where light may be represented for example as a 0 in the bit map. It is this rewritten data which is passed on to the output. Finally, the increment block 250 restarts the process loop over at the next pixel address.

Figure 3:
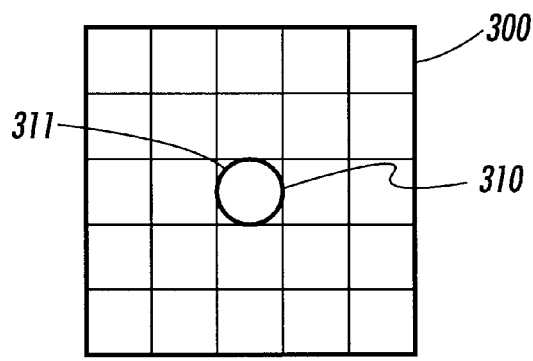
FIG. 3 shows a preferred embodiment template window.

FIG. 3 depicts a preferred embodiment 5×5 window 300 with a center pixel 310 as the window origin, which is used in locating the window 300 about a given target pixel. A circle 311 has been added as a quick visual indicator of the origin pixel location within the window. It is this origin pixel 310 which is typically stepped across all pixel address locations as each pixel location in turn becomes a target pixel. For each pixel address, the pixel values within the window 300 are compared to a set of templates for a possible match, as described above in the prior discussion of FIG. 2. While the discussion above of FIGS. 2 and 3 describes the template matching filtering process as a serial operation, where successive target pixels are defined and processed, it will also be recognized by one skilled in the art that a parallel process could be employed where multiple target pixels could be processed simultaneously using multiple windows and multiple matching processors. The bitmap image data may be divvied-up in any number of ways in order to achieve this parallel processing of the image data. One preferred approach would be by using segmentation to divide the image data into text and graphics for example. Another way and the preferred approach for color images, would be to separate out the color planes and process each individually. There are many other approaches that will be apparent to those skilled in the art.

Figure 4:
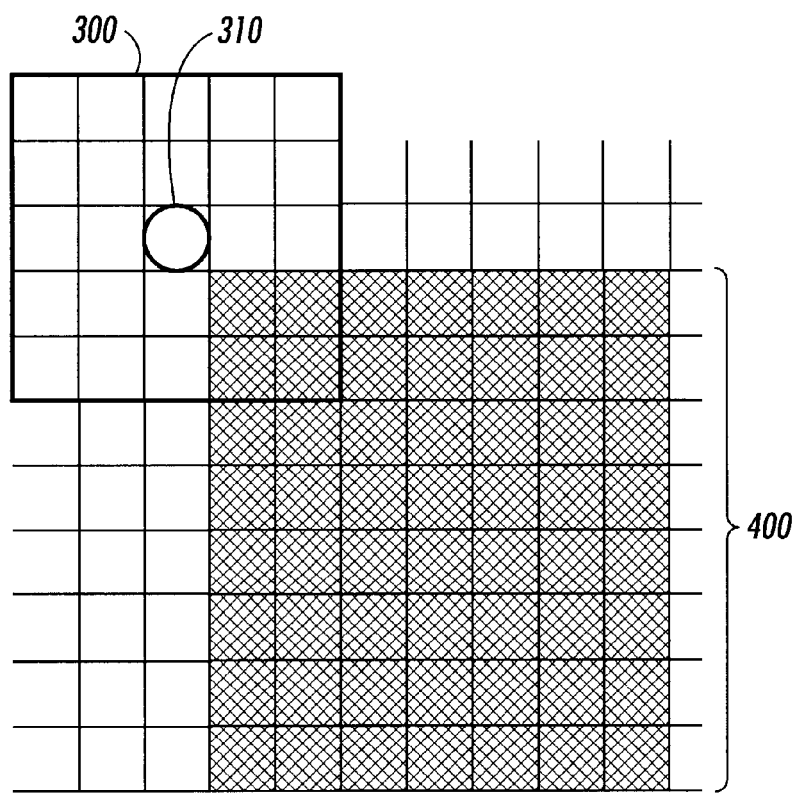
FIG. 4 shows a window placed upon an image data bitmap.

FIG. 4 shows the superimposition of window 300 upon a segment of pixel image data. Pixel locations 400 where toner is to be placed are "on" pixels and are depicted as shaded. In FIG. 4, the window origin pixel 310 has come to the first target pixel location in its scan path where the pattern of values in the window 300 will produce a match to a preferred embodiment template. These preferred embodiment templates are shown in FIG. 5.

Figure 5:
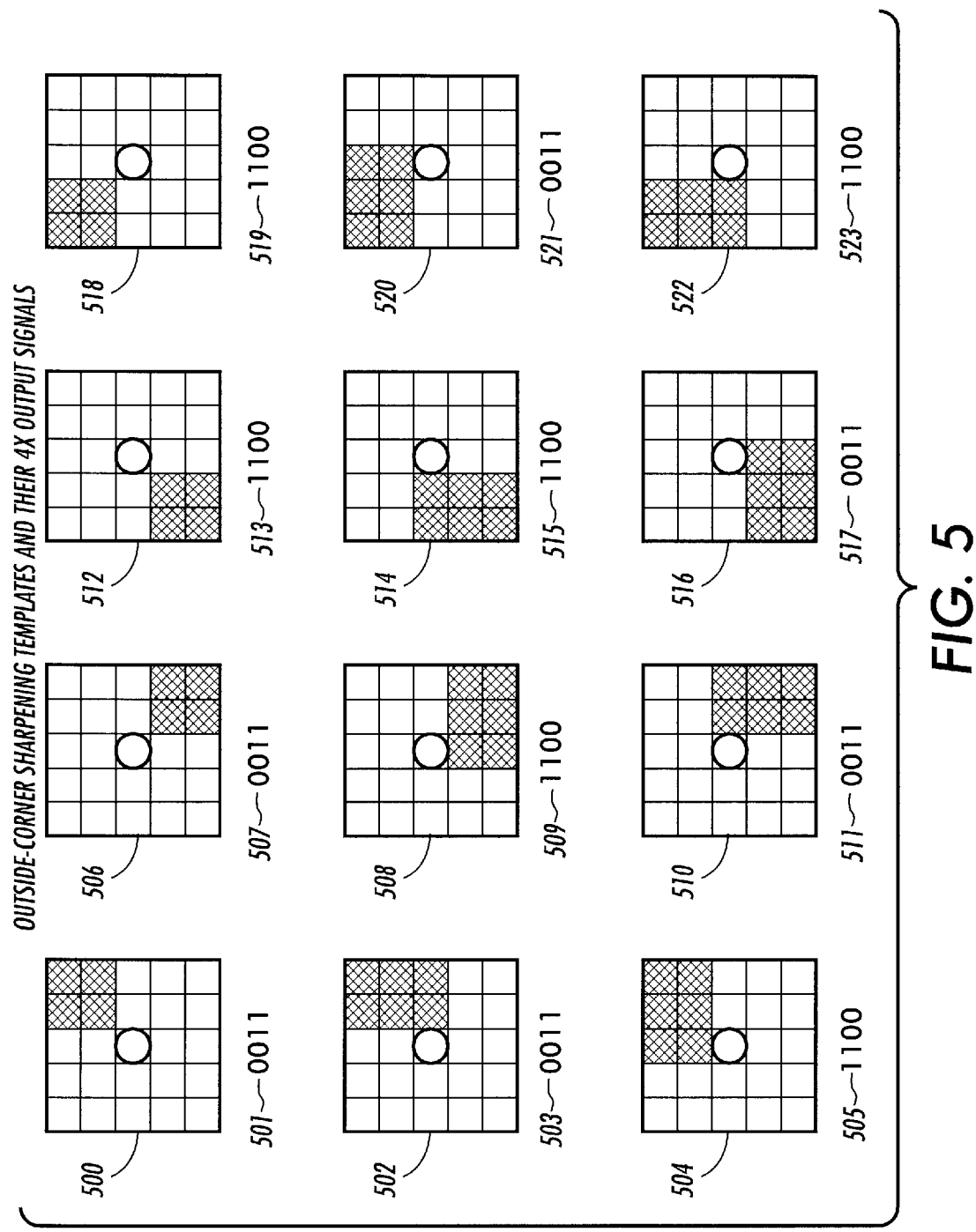
FIG. 5 shows a preferred embodiment of outside corner templates and 4× output signals.

There are 12 preferred embodiment templates for matching as depicted in FIG. 5: templates 500, 502, 504, 506, 508, 510, 512, 514, 516, 518, 520, and 522. It is with template 506 that there is a match against the data as found in window 300 of FIG. 4. For each of the above templates there is associated a 4× output signal code 501, 503, 505, 507, 509, 511, 513, 515, 517, 519, 521, or 523, just below it. The code in this preferred embodiment is typically either "0011" or "1100" which is a shorthand for the pixel data to be substituted for the target pixel at the center window origin pixel 310 address location. The associated code in the present example for the output of template 506 is the 4× output signal code 507.

Output code 507 has as its shorthand value the representation "0011".

Each digit is an "off" (zero) or "on" (one) indication for one quarter of a pixel. In other words, the first and second quarters of the target address pixel will be "off" and the third and forth quarters of the pixel will be "on" and thereby drive a writing signal to produce a darkened output. This may be achieved in a preferred embodiment, by a 4× increase of all the data. This means that for pixel locations where there was no template match, all the original "0" value pixels now have a value assignment of "0000" and the original "1" value pixels get a "1111" data assignment. For purposes of clarity, the drawings do not show this 4× increase in data for those pixel locations with no template match. All of the 4× data is then passed to a high addressability (HA) laser system operating at four times (or more) the operational frequency then would otherwise normally be required. However, as will be apparent to one skilled in the art, other multiples besides 4× may be used, for example 1.5×, 2×, 8× etc. In an alternative approach, a signal derived from the output code is sent as leading and lagging address information to a pulse width and position modulator (PWPM). PWPM techniques are well known in the art. Exemplary examples of which are provided in U.S. Pat. Nos. 5,184,226 and 5,504,462 both incorporated in their entirety by reference herein for their teaching. The result of this approach may only effect an early leading edge or late lagging edge or both; or it may create a pixel dot where none existed as described below.

In FIG. 6 we see the data result of the above substitution within the data map. The original data pixel locations 400 remain, however a half pixel 600 is added to the pixel data at that address location of the center target where the template match was made. Note that the half pixel 600 is actually comprised of two quarter pixels and that as would be apparent to one skilled in the art, other incremental divisions of a pixel could be used.

Figure 8:
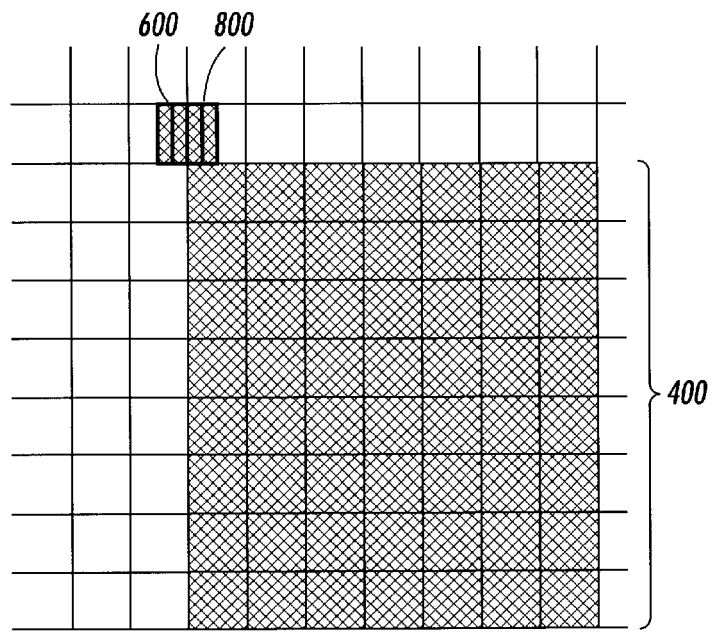
FIG. 8 depicts the bitmap data result of after a second template match.

In FIG. 7, the address for the origin pixel 310 has been incremented as per increment block 250 of FIG. 2. This has shifted window 300 one pixel to the right. Here again there is a match with a template which generates a change to the image structure. This time it is with template 508 as displayed in FIG. 5. Associated with template 508 is output code 509 "1100". FIG. 8 depicts the addition of the resultant two "on" signals or quarter pixels 800 to the data bitmap comprising original pixel locations 400, and the earlier match generated two quarter pixels 600.

Figure 9:
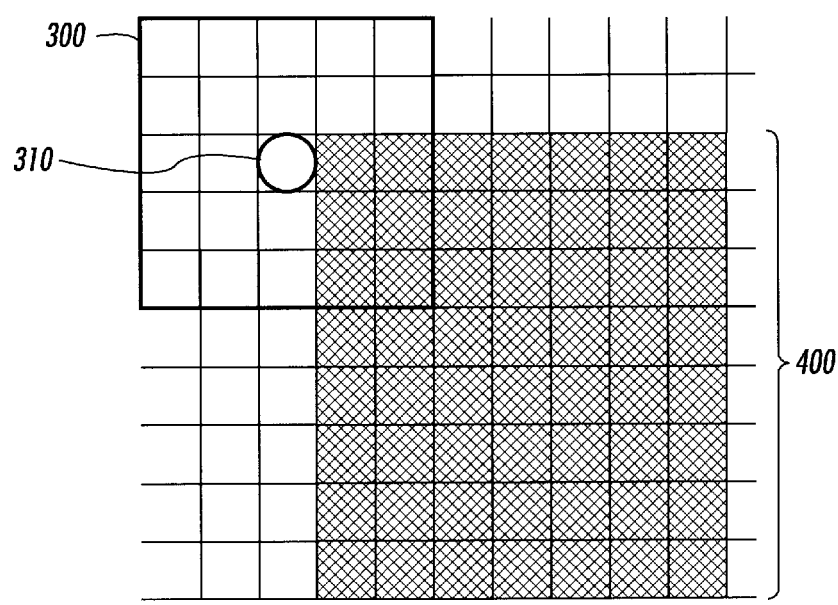
FIG. 9 shows a window placed upon a third address in the image data bitmap.
Figure 10:
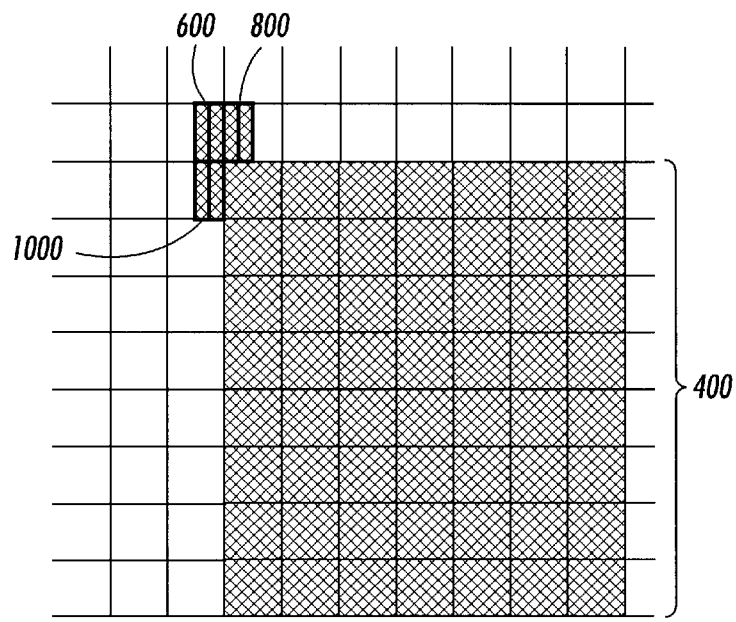
FIG. 10 depicts the bitmap data result of after a third template match.

The address for the origin pixel 310 is again and repeatedly stepped by increment block 250 across the remainder of locations in the row. For that row there are no more template matches for our example data 400. The window 300 is stepped across the next row until it comes to the location depicted in FIG. 9. Here at this location there is a template match with template 510. Utilizing the associated output code 511 "0011" yields the bit map result displayed in FIG. 10. The two quarter pixels 1000 are now in place in the bit map and in combination with the quarter pixels 600 and 800 create a preferred embodiment cluster of sub-pixels about the corner of original pixel location data 400. This ear like cluster results in a sharpened appearance upon printing or display.

Figure 11:
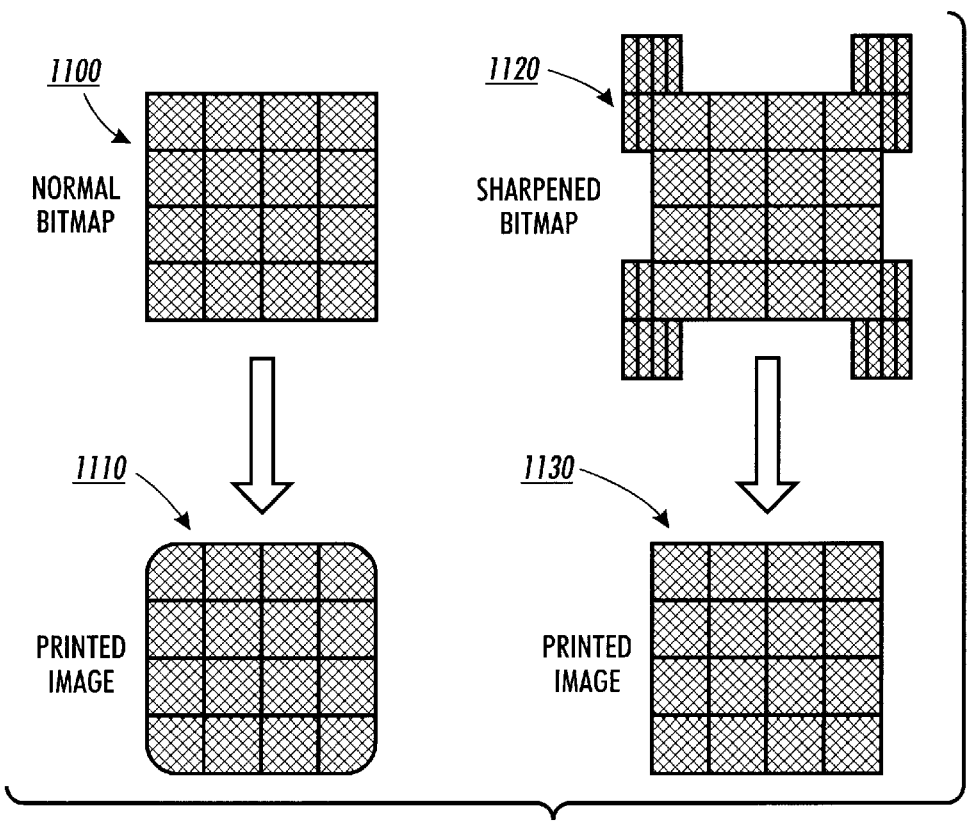
FIG. 11 shows sharpened and unsharpened bitmaps and their printed appearance.

An example utilizing all FIG. 5 templates is shown in FIG. 11.

Starting with normal bitmap 1100, printed image 1110 shows how the corners get undesirably rounded off when printed. The sharpened bitmap 1120 depicts bitmap 1100 after application of the present preferred embodiment. Each corner of sharpened bitmap 1120 has been sharpened. This yields a enhanced printed image 1130 which has the original intended appearance of normal bitmap 1100. The example depicted in FIG. 11 shows right angle corners oriented normally on the page. It will be apparent to one skilled in the art that the invention applies to corners structure of all orientations, positions, and angles.

Figure 20:
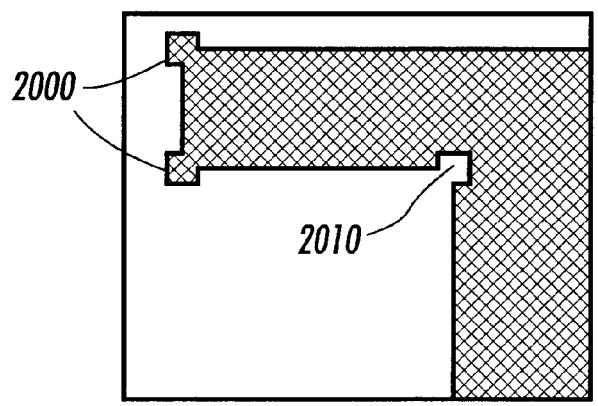

While the examples given above address sharpening of outside corners, the same techniques may be applied to sharpening inside corners to achieve an ink trap as depicted in FIG. 20. The templates of FIG. 5 are reversed. The "on" or dark pixels are made "off" or white pixels. The white "off" pixels are in turn reversed to become dark "on" pixels. Such reversed templates will now match against and identify inside corners. By also reversing the corresponding associated output codes, so as to replace "off" or white (no toner or ink) sub-pixels into the bit map, ink traps are thereby created.

Variations of the above templates and output signals may be used to achieve the desired sharpening effect for a given intended printing or display device. The templates shown in the example are preferred for many xerographic marking processes. Alternative templates and output signals could identify and insert more or less structure about a corner for modification for a printing or display process as determined by its corner rendition performance, desired appearance, and the budget allowed for the modification. Please note that the final printed or displayed appearance may then be other than a truer representation of the original bit map. With application of the invention to a particular situation the printed or displayed corner may possess an extra tip or a notch, which could appear extra sharp. In some cases the sharpening may not be able to fully compensate for a rounding process and the result would be rounder than indicated by the input bit map.

Additional information may be used to guide the template matching process. For instance a data type indicator, or tag, may indicate that an image object is text, thereby requiring corner sharpening. Other tags could disable the matching operation. That is, the use of corner sharpening could be "tag driven" or the templates could be applied to a tag plane to generate output signals, where a window of tags would be applied to a match engine to generate an output signal.

Further, as would be apparent to one skilled in the art, the invention is clearly extensible into the area of grayscale image data. While the description above has stayed within simple binary image data examples, the invention may also be applied to grayscale data where a given pixel may have a shade value over a range of values between saturated black to saturated white. In particular the technique is applicable to loose grayscale template matching techniques such as those disclosed in U.S. patent application No. 09/505,875, entitled "Lose-Gray-Scale Template Matching" which is now U.S. Pat. No. 6,678,414 issued on Jan. 13, 2004 to Robert P. Loce and Clara Cuciurean-Zapan. A gray-scale version of the above described process is especially important where the input image possesses gray edges. This image data situation is often encountered for anti-aliased data and scanned image data. Loose gray-scale templates and the compatible matching process could be applied where the example above uses binary imagery and binary templates.

Figure 12:
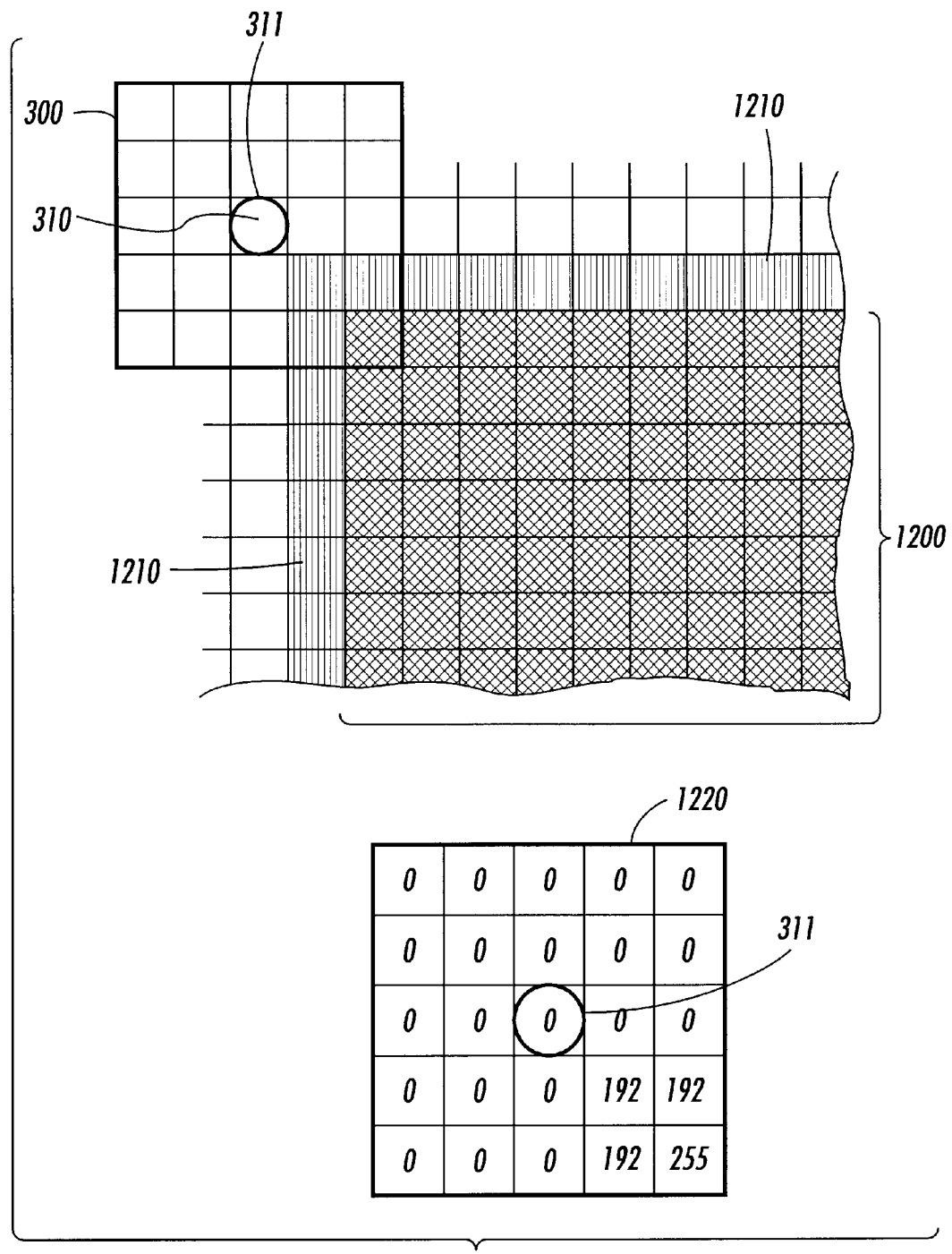
FIG. 12 shows a window placed upon a grayscale image bitmap and the corresponding matching template.

FIG. 12 shows the invention applied to grayscale pixel data in a preferred embodiment 5×5 window 300 with window origin pixel 310. A circle 311 is provided as a visual indicator of the origin pixel location within the window. Here we have a corner image of grayscale data where the pixels in a preferred embodiment may have any one of 256 grayscale values associated with it, from 0 through 255. The main bit map body 1200 of the image has pixel values of 255 and the edge pixels 1210 of the image have a grayscale level of 192. All other pixel locations in the bitmap shown in FIG. 12 have a grayscale level of zero.

The window 300 is scanned or stepped across the grayscale image data from left to right and from the top down as described above. Here in FIG. 12 the window 300 has arrived at the first target pixel location where a template match is desired. A preferred embodiment template 1220 is depicted with the necessary pixel values for each pixel location within the template 1220 to achieve the desired match at this address location. The numerical values shown in the template 1220 consisting of "0", "192", and "255", have some grayscale looseness associated with them. This means that there is a range of pixel grayscale values as found within a bitmapped image which provides an acceptable match for each of the above numerals. The following table provides a preferred embodiment range:

| Numerical Indicator | Range of grayscale values |
| --- | --- |
| 0 | 0–8 |
| 192 | 176–208 |
| 255 | 247–255 |

For example, this means that any image pixel with a grayscale value from 0 to 8 will provide a match to a template pixel when that template pixel has an assigned numerical value of "0". For all locations within the template with a numerical assignment of "0", an image pixel grayscale value of 0–8 will provide a match for that template pixel location.

Upon the successful match of template 1220 with the bitmap image data as found in FIG. 12, a new pixel grayscale value is substituted for the pixel value found at the address where origin pixel 310 is located. In a preferred embodiment this will mean a substantially dark grayscale value like 255 will be placed at that location. However, as will be apparent to those skilled in the art, this value could be customized by template match (i.e. bitmap location) or by another parameter, such as the pixel's original grayscale value. In that situation if the original value is white or nearly white the replacement value would be a gray value such as 192. However, if the value being replaced is gray, the replacement value would then be a dark value like 255.

Figure 13:
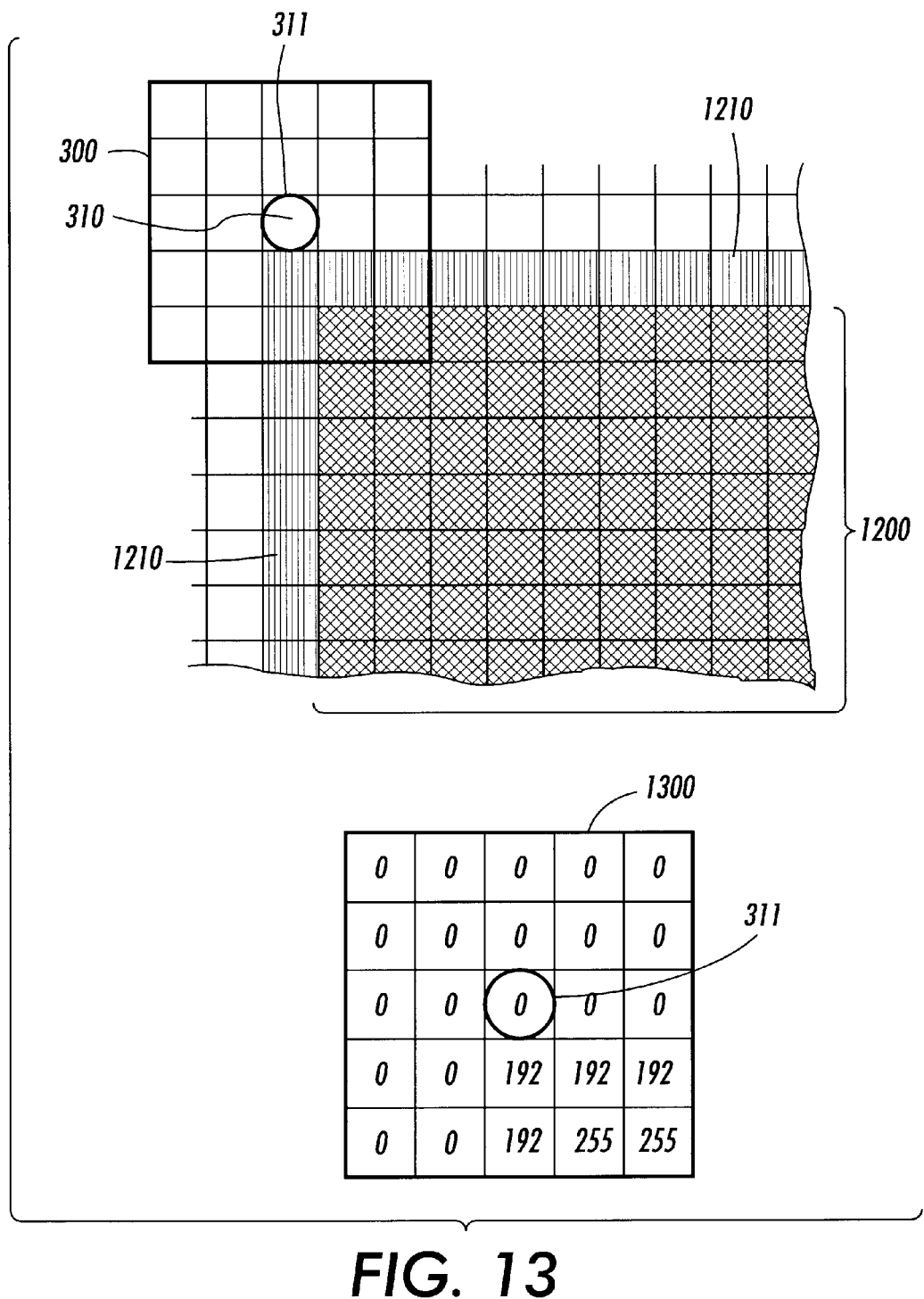
FIG. 13 shows a window placed upon a second address in the grayscale image data bitmap and the corresponding matching template.

In FIG. 13 the counter address for the location of the window 300 origin pixel 310 has been incremented by one. Here, there is another template match. The template 1300 depicts the loose grayscale values used to yield a match at this bitmap location. As discussed above, a substantially dark grayscale value like 255 will be substituted at this location for the grayscale value originally there in the bitmap.

Figure 14:
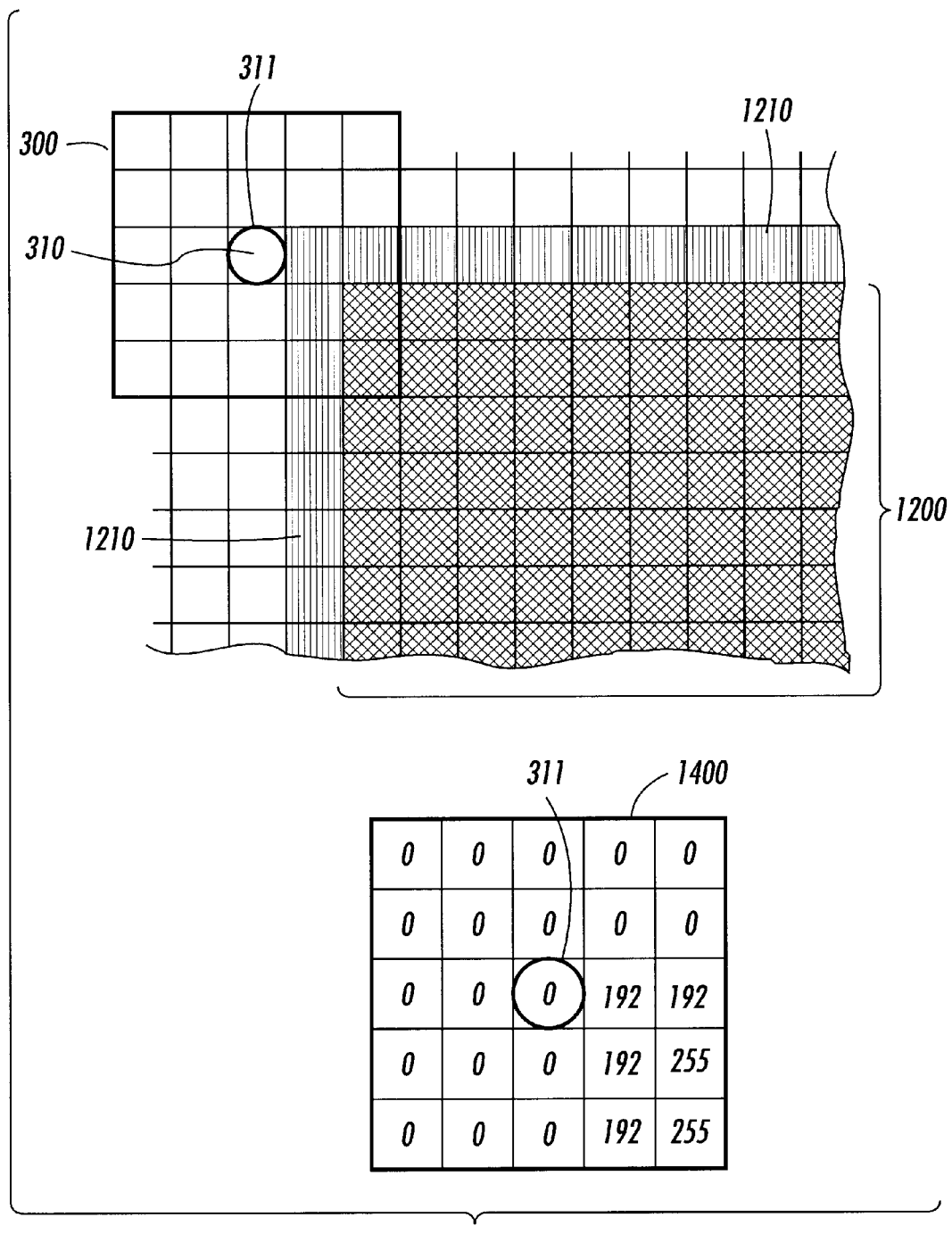
FIG. 14 shows a window placed upon a third address in the grayscale image data bitmap and the corresponding matching template.
Figure 15:
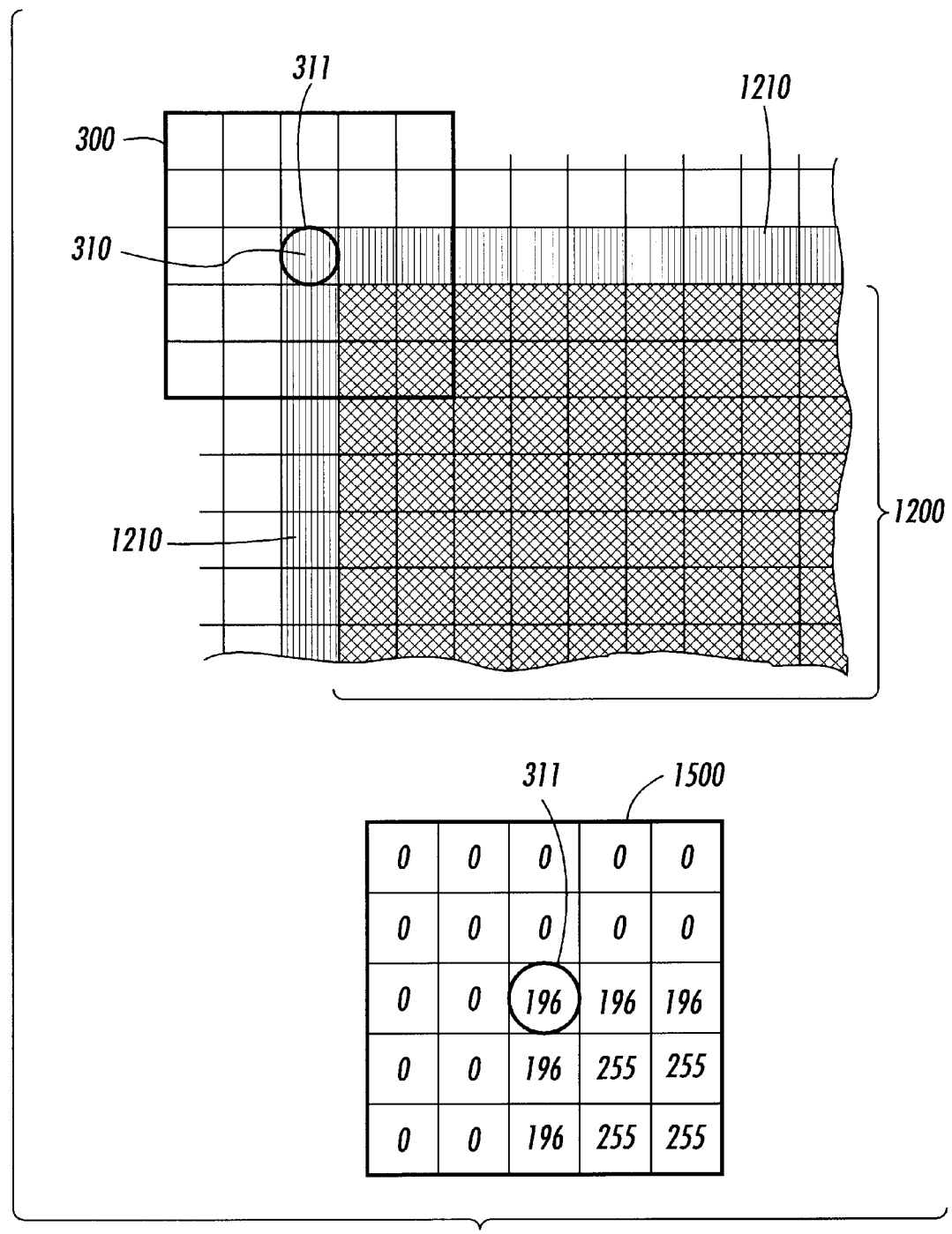
FIG. 15 shows a window placed upon a fourth address in the grayscale image data bitmap and the corresponding matching template.
Figure 16:
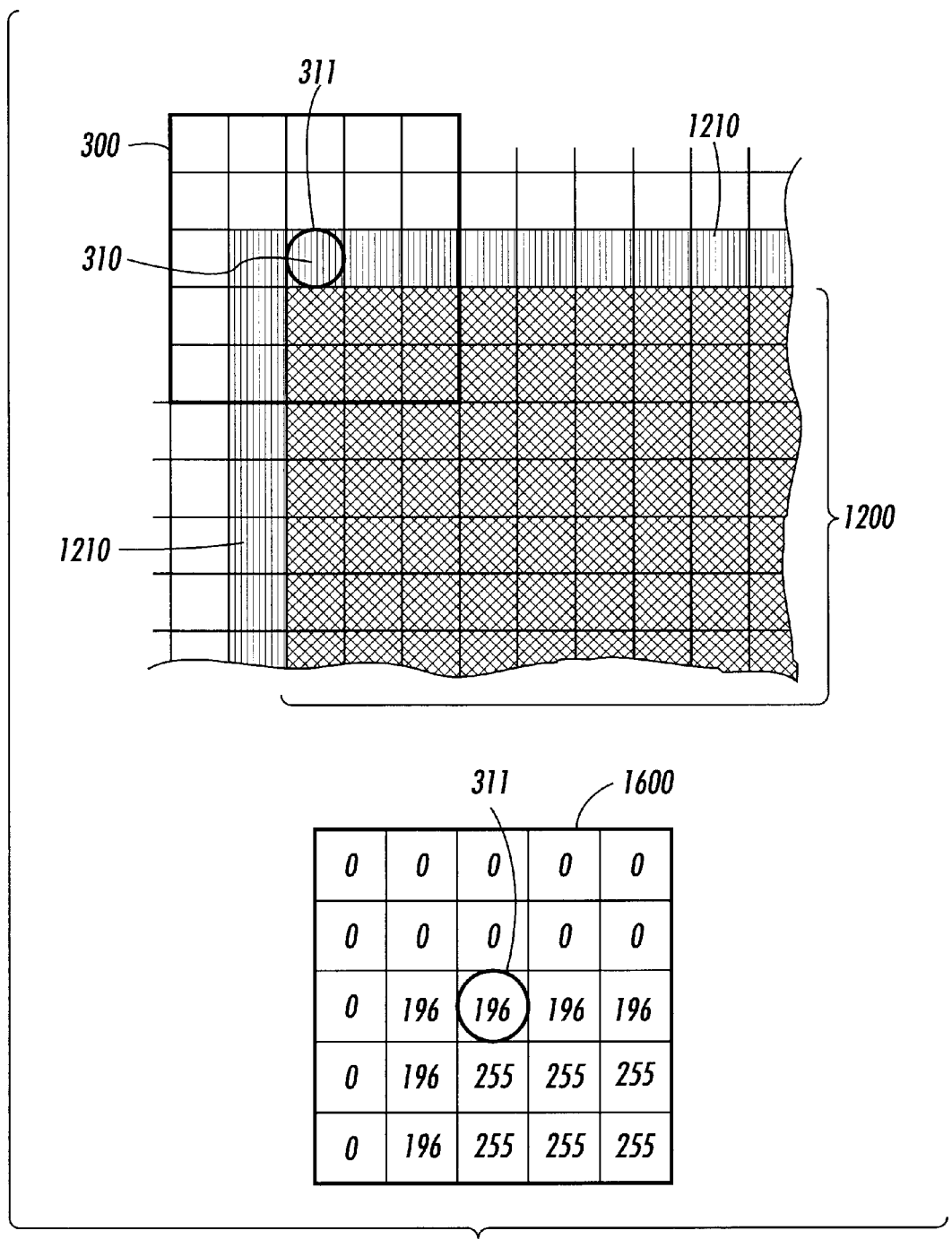
FIG. 16 shows a window placed upon a fifth address in the grayscale image data bitmap and the corresponding matching template.
Figure 17:
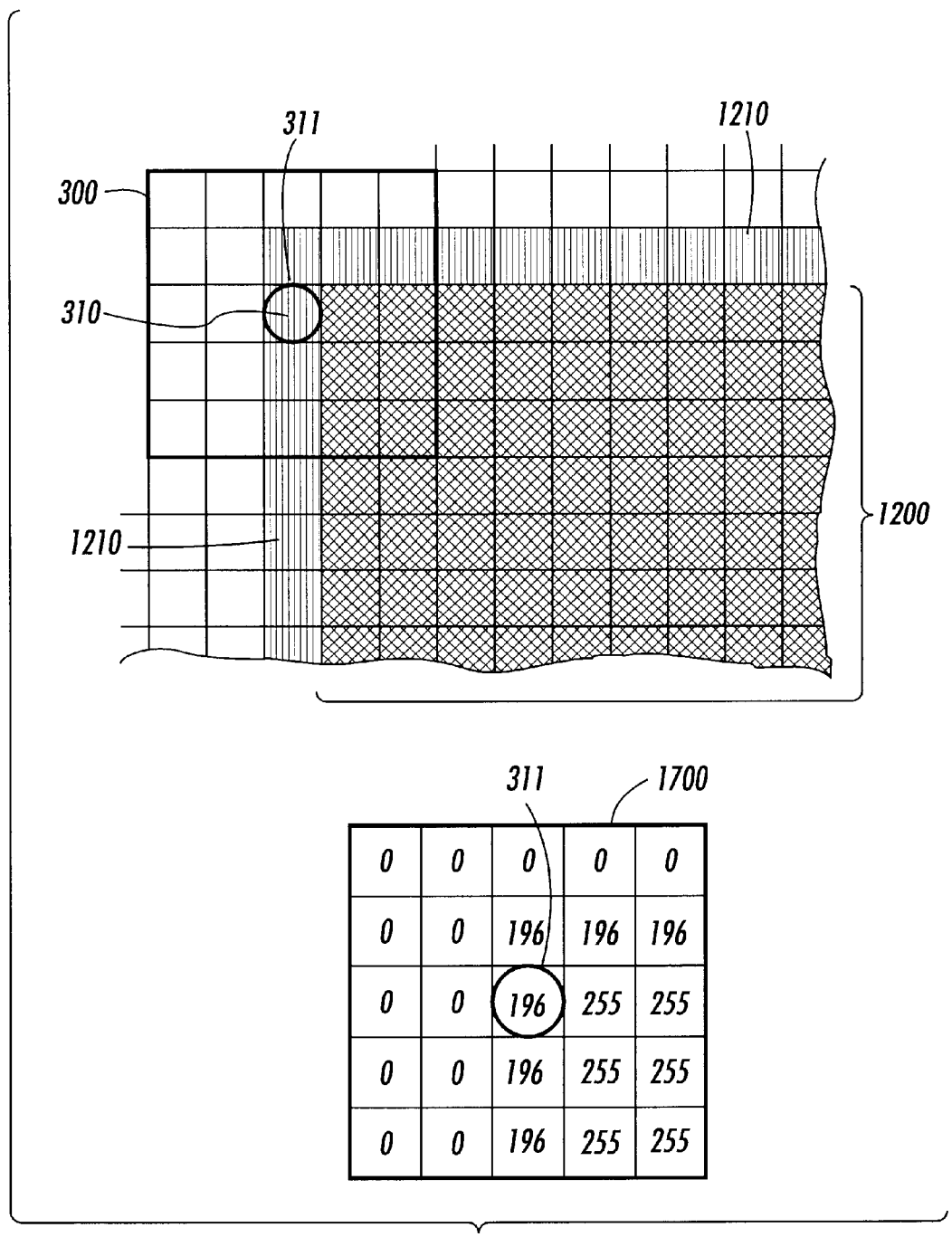
FIG. 17 shows a window placed upon a sixth address in the grayscale image data bitmap and the corresponding matching template.
Figure 18:
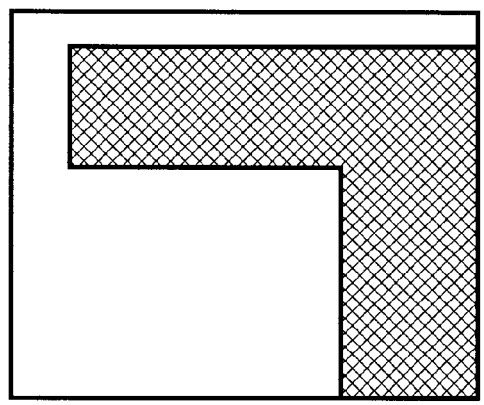
FIGS. 18, 19, and 20 depict prior art for corner sharpening.
Figure 19:
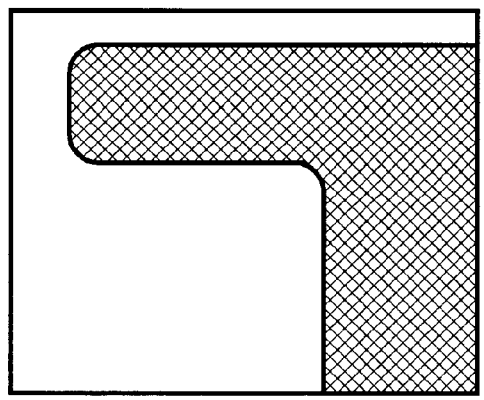

FIG. 14 shows the next match to the bitmap data 1200 and 1210. The window 300 and origin pixel 310 has been stepped down one row and to the first column address location as described above to reach the next template match with template 1400. FIG. 15 shows a further match location as against template 1500 as do FIGS. 16 and 17 with templates 1600 and 1700 respectively. In each case that pixel location upon which the origin pixel is found has its data value substituted for a darker value. In total, the pixel value substitution from the matching of loose grayscale templates 1220, 1300, 1400, 1500, 1600 and 1700 will achieve a clustered "ear" of darker pixel values about the corner depicted by bitmap data 1200 and 1210. This "ear" or cluster will achieve the sharpening of corner of grayscale data in the same manner as found with the binary bitmap data 400 in FIG. 10 and as further depicted in FIG. 11. As will now be apparent to one skilled in the art similar templates are easily constructed by rotation to achieve sharpening affects upon corners in other orientations.

As will now also be apparent to one skilled in the art, inside corners in grayscale data may be sharpened with ink-traps by reversing the data polarity in the loose grayscale templates described above. This is achieved by taking the templates and changing all "0" values to become "255" and changing all "255" values to "0" values. The "192" values remain unchanged. The loose grayscale templates so arranged will find inside corners. Then by changing the data substitution at origin pixel 310 from substituting a substantially darker pixel value as discussed above, to instead substituting a more nearly white pixel value, an ink-trap is thereby achieved.

Although the invention has been described above in black and white, it has intended application in color imagery as well. One method would apply the matching process described above on one or more color planes within a color image representation such as cyan, magenta, yellow and black image separations. Alternatively, matching could be performed across several color planes simultaneously as described in U.S. patent application Ser. No. 09/219,705, "Systems and Methods for Template Matching of Multicolored Images" which is now U.S. Pat. No. 6,356,654 issued Mar. 12, 2004, to R. Loce, M. Cianciosi, and Ying Wei Lin. The output signal may incorporate values from one or more color planes, rather than the simple ones and zeros of a single color plane as shown above.

While the embodiment disclosed herein is preferred, it will be appreciated from this teaching that various alternative, modifications, variations or improvements therein may be made by those skilled in the art, which are intended to be encompassed by the following claims.

What is claimed is:

1. A method of corner sharpening in the display of a bitmapped digital image, comprising:
    identifying pixel locations near a corner by comparing the bitmap digital image to templates; and,
    substituting pixel values in the identified pixel locations to achieve a clustering of the substituted pixel values about the corner.

2. The method of claim 1 wherein the step of identifying includes stepping a window across the image data and comparing the data in the window to the data in the templates.

3. The method of claim 2 wherein the corner is a outside corner.

4. The method of claim 3 wherein the substituted pixel values have a binary value of "1".

5. The method of claim 2 wherein the corner is an inside corner.

6. The method of claim 5 wherein the substituted pixel values have a binary value of "0".

7. The method of claim 2 wherein the templates are binary data templates.

8. The method of claim 2 wherein the templates are loose grayscale templates.

9. The method of claim 2 wherein the substituted pixel values have a binary value of "1".

10. The method of claim 2 wherein the substituted pixel values have a binary value of "0".

11. The method of claim 2 wherein the substituted pixel values have an increased grayscale value.

12. The method of claim 2 wherein the substituted pixel values have an decreased grayscale value.

13. The method of claim 2 wherein the comparing of data in the window to the data in the templates, the comparing for some or all of the templates is performed in parallel.

14. A method of corner sharpening in the display of a bitmapped digital image, comprising:

identifying pixel locations near a corner by comparing the bitmap digital image to templates; and, generating a signal appropriate to modify the writing of the bitmap digital image and achieve a clustering of the substituted pixel values about the corner.

15. The method of claim 14 wherein the step of identifying includes stepping a window across the image data and comparing the data in the window to the data in the templates.

16. The method of claim 15 wherein the corner is a outside corner.

17. The method of claim 15 wherein the corner is an inside corner.

18. The method of claim 15 wherein the templates are binary data templates.

19. The method of claim 15 wherein the templates are loose grayscale templates.

20. The method of claim 15 wherein the generating step generates a signal appropriate for a pulse width position modulator.

21. The method of claim 15 wherein the generating step generates a signal appropriate for a high addressability laser system.

22. A method of corner sharpening a bitmapped digital image in a printing machine, comprising:

identifying pixel locations near a corner by comparing the bitmap digital image to templates;

substituting pixel values in the identified pixel locations to create a clustering of the substituted pixel values about the corner in a resultant image; and, printing the resultant image.

23. The method of claim 22 wherein the step of identifying includes stepping a window across the image data and comparing the data in the window to the data in the templates.

24. The method of claim 23 wherein the printing machine is a xerographic printing machine.

25. The method of claim 24 wherein the corner is a outside corner.

26. The method of claim 24 wherein the corner is an inside corner.

27. The method of claim 24 wherein the templates are binary data templates.

28. The method of claim 24 wherein the templates are loose grayscale templates.

29. The method of claim 24 wherein the substituted pixel values have a binary value of "1".

30. The method of claim 24 wherein the substituted pixel values have a binary value of "0".

31. The method of claim 24 wherein the substituted pixel values have an increased grayscale value.

32. The method of claim 24 wherein the substituted pixel values have an decreased grayscale value.

* * * * *